US008023828B2

(12) United States Patent
Beausoleil et al.

(10) Patent No.: US 8,023,828 B2
(45) Date of Patent: Sep. 20, 2011

(54) QUANTUM INFORMATION CONVERSION BETWEEN MATTER AND LIGHT REPRESENTATIONS

(75) Inventors: Raymond G. Beausoleil, Redmond, WA (US); William J. Munro, Bristol (GB); Timothy P. Spiller, Bristol (GB); Kae Nemoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1738 days.

(21) Appl. No.: 11/252,964

(22) Filed: Oct. 17, 2005

(65) Prior Publication Data

US 2007/0145271 A1 Jun. 28, 2007

(51) Int. Cl.
*H04B 10/00* (2006.01)
*G11C 13/04* (2006.01)
(52) U.S. Cl. ........................................ 398/140; 365/110
(58) Field of Classification Search .......... 398/140–172; 365/110–112
See application file for complete search history.

(56) References Cited

U.S. PATENT DOCUMENTS

| 7,173,272 B2 * | 2/2007 | Ralph .............................. 257/13 |
| 7,220,954 B2 * | 5/2007 | Kuzmich et al. ........... 250/214.1 |
| 2005/0254823 A1 * | 11/2005 | Beausoleil et al. ........... 398/140 |

OTHER PUBLICATIONS

Blinov, B. B.—"Observation of entanglement between a single trapped atom and a single photon"—Nature vol. 28, Mar. 11, 2004—pp. 153-157.

Lukin, M. D.—"Colloquium: trapping and manipulating photon states in atomic ensembles"—Reviews of Modern Physics APS Through AIP vol. 75 No. 2—Apr. 2003—pp. 457-472.
Matsukevich D. N. et al—Entanglement of a photon and a colllective atomic excitation—Physical Review Letters vol. 95 No. 4—Jul. 22, 2005—pp. 040405/1-4.
Duan L. M. et al—"Efficient engineering of multiatom entanglement through single-photon detections"—Physical Review Letters—bol 90 No. 25—Jun. 27, 2003—pp. 253601/1-4.
Matsukevich D. N, et al—"Quantum state transfer between matter and light"—Science American Assoc Adv Sci USA—vol. 306 No. 5696—Oct. 22, 2004—pp. 663-666.
Nizovtsev et al., "A Quantum Computer Based on NV Centers in Diamond . . . ," Optics and Spectroscopy, vol. 99, No. 2, pp. 233-244 (2005).
Hayes et al., "Utilizing Encoding in Scalable Linear Optics Quantum Computing," Aug. 15, 2004, quant-ph/0408098 v1.
Ralph et al., "Loss Tolerant Optical Qubits," Jan. 31, 2005, quantph/0501184 v1.
Gilchrist et al., "Efficient Parity Encoded Optical Quantum Computing," May 17, 2005, quant-ph/0505125 v1.
Gheri et al., "Entangelment Engineering of One-Photon Wavepackets using a Single-Atom Source," Feb. 25, 1998, quant-ph/9802060.
Turchette et al., "Measurement of Conditional Phase Shifts for Quantum Logic," Nov. 7, 1995, quant-ph/9511008.

* cited by examiner

*Primary Examiner* — Nathan Curs (57) ABSTRACT

Structures and methods allow: transfer of quantum information represented using the states of light to a representation using the states of matter systems; transfer of quantum information represented by the states of matter systems to a representation using the states of light; and error resistant encoding of quantum information using entangled states of matter and light to minimize errors.

18 Claims, 6 Drawing Sheets

QUANTUM INFORMATION CONVERSION BETWEEN MATTER AND LIGHT REPRESENTATIONS

BACKGROUND

Many physical implementations of quantum information systems have been proposed. One class of quantum system uses the quantum states of atoms, ions, molecules, or other matter to represent quantum information such as qubits. Some particularly promising proposals of this type implement unitary operations and readout in matter qubits via laser-driven optical transitions. Examples of these systems include ion-trap systems such as described by J. Cirac and P. Zoller, Phys. Rev. Lett. 74, 4091 (1995), system using nitrogen-vacancy (N-V) defects in diamond as described by Jelezko et al., Phys. Rev. Lett. 92, 076401 (2004) and Nizovtsev et al., Optics and Spectroscopy 99, 233 (2005), and systems using the Pauli-blockade effect in quantum dots with a single excess electron as described by Pazy et al., Europhys. Lett 62, 175 (2003) or by Nazir et al., Phys. Rev. Lett. 93, 150502 (2004).

Other proposed quantum information systems use the quantum states of photons to represent qubits. Knill, Laflamme, and Milburn, Nature 409, 26 (2001), for example, proposed a quantum computing system using optical qubits manipulated with linear optics. Optical quantum information systems using non-linear light-light interactions such as provided in some systems exhibiting electromagnetically induced transparency (EIT) have also been developed. See, for example, R. G. Beausoleil, W. J. Munro, and T. P. Spiller, Journal of Modern Optics 51, 1559 (2004).

Matter and photonic quantum information systems each have advantages. For example, stationary matter systems may be better for storage of quantum information than are photons, which inherently move. In contrast, implementing quantum interactions between separated matter systems can present technological and architectural challenges, especially in systems containing many qubits. In contrast, optical systems capable of selecting and bring photons together for interactions may be constructed using conventional optical systems. A hybrid system using both matter and photons to represent or convey quantum information may be able to use the advantages of matter and photonic systems. However, such hybrid systems will generally require structures and techniques for converting or transferring quantum information between matter and photonic representations.

SUMMARY

In accordance with one aspect of the invention, processes and systems can transfer quantum information between a light mode and a matter system. In one such process, a state of an input mode for photons can represent quantum information to be written into a matter system. The process includes: initializing the matter system in a known state that is a combination of basis states, applying to the matter system an excitation capable of exciting at least one of the basis states to a corresponding excited state; and measuring a combined state of the input mode and an emission mode for photons emitted from the matter system. The measurement of the combined state can be such that states of the emission mode and the matter system become disentangled and the state of the matter system depends on the quantum information.

A system in accordance with this aspect of the invention can include an input mode, a matter system, an excitation system, an emission mode, and a measurement system. The input mode is for a photonic state representing quantum information. The matter system has quantum states including first and basis states, and the excitation system is capable of exciting at least one of the basis states to a corresponding excited state. The emission mode is for photons emitted from the matter system when the matter system transitions from the excited state. The measurement system measures a combined state of the input mode and the emission mode, and the measurement of the combined state is such that states of the emission mode and the matter system become disentangled and the resulting state of the matter system depends on the quantum information.

In accordance with another aspect of the invention, a process initially represents quantum information using a state of a matter system, wherein quantum states of the matter system include a first and second basis states. The process then applies to the matter system an excitation capable of exciting at least one of the basis states to a corresponding excited state; waits a period of time such that a photon is likely to be emitted from a decay of the excited state and subsequently enter an emission mode; and measures the matter system in a diagonal basis.

A system in accordance with another embodiment of the invention includes a matter system, an excitation system, an emission mode, a measurement system, and a state correction system. The matter system has quantum states including first and second basis states, and the excitation system is capable of exciting at least one of the first and second basis states to a corresponding excited state. The emission mode, which passes through the state correction system, is for photons emitted from the matter system when the matter system transitions from the excited state. The measurement system can be configured to measure the matter system and control the state correction system, so that the state correction system performs an operation selected according to a result from the measurement system.

Yet another embodiment of the invention provides a process for manipulating quantum information. The process includes encoding the quantum information using a representation including basis states that are products including a first state of a first system and a second state of a second system. The first state in particular is an entangled state of a first matter system and a first photon mode, and the process measures the first photon mode to detect loss of photons.

BRIEF DESCRIPTION OF THE DRAWINGS

Use of the same reference symbols in different figures indicates similar or identical items.

DETAILED DESCRIPTION

Structures and methods are provided that allow: transfer of quantum information represented using quantum states of light to a representation using the quantum states of matter systems; transfer of quantum information represented by the states of matter systems to a representation using the states of light; and encoding of quantum information using entangled states of matter and light to minimize or correct errors. The process of transferring quantum information from light to matter systems is sometime referred to herein as "writing" quantum information, and the process of transferring quantum information from matter systems to light is sometime referred to herein as "reading" quantum information. Encoding of quantum information using entangled states of light and matter can minimize errors associated with photon loss, for example, during reading or writing of quantum information.

Figure 1:
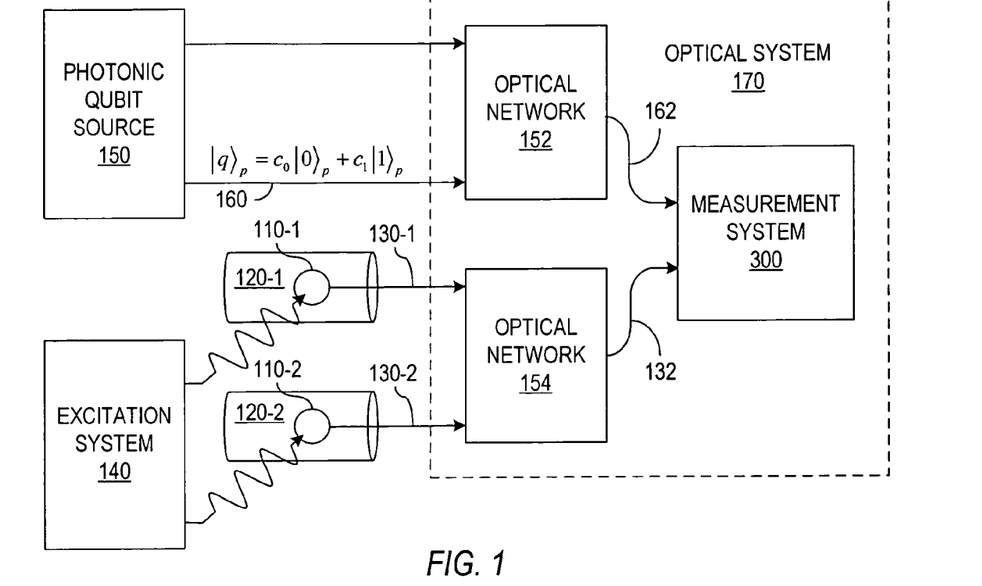
FIG. 1 shows a system in accordance with an embodiment of the invention able to write quantum information represented using photon states into a representation using quantum states of a matter system.

FIG. 1 schematically illustrates an exemplary embodiment of a quantum information system 100 in accordance with an embodiment of the invention. System 100 includes two matter systems 110-1 and 110-2, sometimes referred to generically as matter systems 110 and a source 150 of a qubit $|q\rangle_p$ or other quantum information that is represented by the state of a photonic input mode 160. In general, source 150 may be a portion of a communication system, a quantum computer, or any quantum information system that produces a photon state representing qubit $|q\rangle_p$ that can be written into one of matter systems 110 for storage or further manipulation. Mode 160 for qubit $|q\rangle_p$ conveys photons from source 150 to an optical system 170 and may be implemented, for example, using a free space light path, a waveguide, or an optical fiber.

Each matter system 110 has quantum states $|\uparrow\rangle$ and $|\downarrow\rangle$, which may be identified with the basis or logical states $|0\rangle$ and $|1\rangle$ of a matter qubit. In an exemplary embodiment, states $|\uparrow\rangle$ and $|\downarrow\rangle$ are long-lived, low-lying spin projection states associated with an atom, a molecule, an ion, a defect in a crystal, or any other type of matter system. Some known systems that may have suitable states and quantum energy levels for matter systems 110 include N-V defects in diamond such as described by F. Jelezko et al., Phys. Rev. Lett. 92, 076401 (2004) or Nizovtsev et al., Optics and Spectroscopy 99, 233 (2005), quantum dots with a single excess electron such as described by E. Pazy et al., Europhys. Lett. 62, 175 (2003) or Nazir et al., Phys. Rev. Lett. 93, 150502 (2004), and various trapped ion and atomic systems.

Figure 2A:
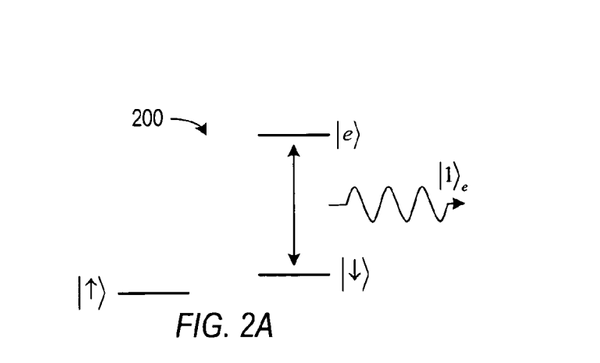
FIGS. 2A and 2B are energy level diagrams for some suitable matters systems used in the system of FIG. 1.

FIG. 2A shows an energy level diagram 200 for one embodiment of matter systems 110. In the embodiment of FIG. 2A, each matter system 110 has an excited state $|e\rangle$ that couples to only one of the states $|\uparrow\rangle$ and $|\downarrow\rangle$ through emission/absorption of a single photon. Without loss of generality, FIG. 2A and the following description assumes that excited state $|e\rangle$ couples to state $|\downarrow\rangle$, and that a transition between excited state $|e\rangle$ and state $|\downarrow\rangle$ is forbidden, e.g., by a selection rule based on a conservation law such as conservation of energy or conservation of angular momentum. Matter systems 110 may also be suitable if a coupling between states $|e\rangle$ and $|\uparrow\rangle$ is present but is weak when compared to coupling between states $|e\rangle$ and $|\downarrow\rangle$.

Figure 2B:
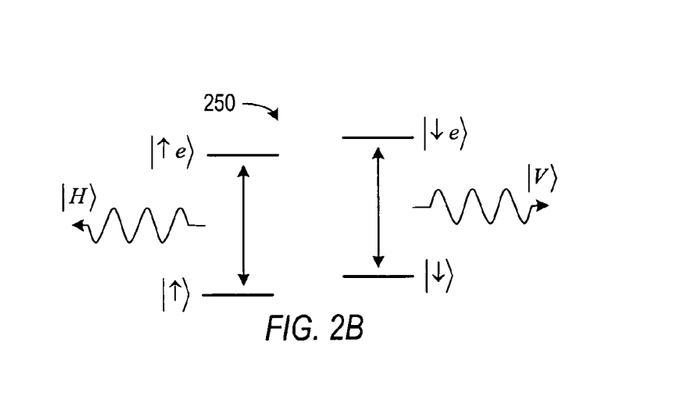

FIG. 2B shows an energy level diagram 250 for an alternative embodiment of matter systems 110. In the embodiment of FIG. 2B, both quantum states $|\uparrow\rangle$ and $|\downarrow\rangle$ of each matter system 110 have respective excited states $|\uparrow e\rangle$ and $|\theta e\rangle$ that respectively couple to states $|\uparrow\rangle$ and $|\downarrow\rangle$ through emission/absorption of a single photon, and the photon emitted/absorbed has a polarization that differs depending on the particular state $|\uparrow\rangle$ or $|\theta\rangle$ involved in the transition. Without loss of generality, the following assumes that excited state $|\uparrow e\rangle$ transitions to state $|\downarrow\rangle$ by emission of a horizontally polarized photon state $|H\rangle$, and excited state $|\downarrow e\rangle$ transitions to state $|\downarrow\rangle$ by emission of a vertically polarized photon state $|V\rangle$. Lim et al., "Repeat-Until-Success Linear Optics Distributed Quantum Computing," PRL 95, 030505 (2005) and Lim et al., "Quantum Computing with Distant Single Photon Sources with Insurance," quant-ph/0408043 v2 (2004) further describe such matter systems.

Matter systems 110 exhibiting the behavior shown in FIGS. 2A and 2B are well suited for systems respectively using a single-rail representation and a polarization representation for photonic qubits. However, each type of representation may have advantages in different applications. For example, with a polarization basis, errors corresponding to photon loss are relatively simple to identify using polarization-preserving, non-absorbing photon detectors such as described by W. J. Munro, K. Nemoto, R. G. Beausoleil, and T. P. Spiller, Phys. Rev. A 71, 033819 (2005), G. J. Milburn and D. F. Walls, Phys. Rev A 30, 56 (1984), or N. Imoto, H. A. Haus, and Y. Yamamoto, Phys. Rev. A 32, 2287 (1985).

Matter systems 110-1 and 110-2 are in respective optical cavities 120-1 and 120-2 sometimes generically referred to herein as optical cavities 120. Each optical cavity 120 preferably has a resonant mode corresponding to the wavelength of photon or photons emitted when excited state or states of the associated matter system 110 decay. Optical cavities 120-1 and 120-2 are also constructed to preferentially leak emitted photons to respective emission modes 130-1 and 130-2. Leaky optical cavities 120 with a highly preferred direction of light emissions can be constructed using known quantum optics techniques. Modes 130, which convey photons, can include optical systems such as free space light paths, waveguides, or optical fibers.

An excitation system 140 in FIG. 1 operates on matter systems 110-1 and 110-2 to selectively change the state of one or both of matter systems 110-1 and 110-2. For example, for a matter system 110 having the energy level diagram of FIG. 2A, excitation system 140 can produce a π-pulse that induces a transition to excited state $|e\rangle$ from a component state $|\downarrow\rangle$ but does not cause the transition to excited state $|e\rangle$ from a component state $|\uparrow\rangle$. For matter systems 110 having energy levels corresponding to FIG. 2B, excitation system 140 can produce π-pulses that efficiently drive both states $|\uparrow\rangle$ and $|\theta\rangle$ to their respective excited states $|\uparrow e\rangle$ and $|\theta e\rangle$. Excitation system 140 may also be used to induce transitions of matter system 110-1 or 110-2 between states $|\uparrow\rangle$ and $|\downarrow\rangle$, e.g., for single-qubit operations, but excitation system 140 may require separate subsystems for the different transitions because of the difference between the energy associated with the transition between state $|\downarrow\rangle$ and state $|\uparrow\rangle$ and the energy associated with the transitions to excited state.

For illustrative purposes, the following emphasizes an exemplary embodiment of system 100, which uses N-V defects in diamond for matter systems 110-1 and 110-2. An N-V defect corresponds a nitrogen (N) atom in place of a carbon (C) atom and next to a vacancy in a diamond crystal. Such defects are know have a triplet ground state corresponding to the spin projections −1, 0, and 1 of a spin-one system, and the ground states have a strongly dipole allowed optical transition to a first excited triplet state. An external magnetic field can be applied to a N-V defect to break the degeneracy of the ground state, and two of the triplet states (e.g., the ±1 spin projection states) can then be used as states $|\uparrow\rangle$ and $|\downarrow\rangle$. The third N-V defect state (e.g., with spin projection 0) is normally not required or used when matter systems 110 represent qubits having states $|\uparrow\rangle$ and $\uparrow\downarrow\rangle$ as basis states. The transition between an excited state and a ground/basis state of an N-V defect produces a photon having an optical wavelength, permitting uses of conventional optical elements and photodiodes in optical system 170.

The N-V defects in an exemplary embodiment of the invention are in nanocrystallites of high-pressure, high-temperature diamond (type 1b). The nanocrystallites, which may be about 20 nm in diameter, can be embedded in resonant cavities 120-1 and 120-2, which may be formed in and on a wafer or die, for example, as defects within a photonic crystal. The entire structure can then be kept at a temperature that provides a desired coherence time for the states of matter systems 110. In general, the spin states of N-V defects are known to remain coherent for milliseconds at room temperature up to seconds at low temperatures (e.g., about 2° K). Excitation system 140 for N-V defects 110-1 and 110-2 preferably includes a laser capable of producing a short pulse for a π-pulse that efficiently excites one or both basis states $|\uparrow\rangle$ and $|\downarrow\rangle$.

Qubit source 150 produces the qubit $|q\rangle_p$ to be written into one of matter systems 110. Equation 1 shows a general form for qubit $|q\rangle_p$, where $c_0$ and $c_1$ are complex constants, and states $|0\rangle_p$ and $|1\rangle_p$ are the qubit basis states of any desired photonic representation. For example, in a single rail representation, states $|0\rangle_p$ and $|1\rangle_p$ can correspond to Fock states respectively containing 0 and 1 photon. Alternatively, in a polarization basis, states $|0\rangle_p$ and $|1\rangle_p$ may correspond to single-photon states $|H\rangle_p$ and $|V\rangle_p$ respectively having horizontal and vertical linear polarizations.

$$|q\rangle_p = c_0|0\rangle_p + c_1|1\rangle_p \quad \text{Equation 1}$$

Optical system 170 optionally includes optical networks or switches 152 and 154. Optical network 152 can select among multiple optical input modes 160 for the light qubit to be written in a matter system 110, and optical network 154 can select among emission modes 130 to select which matter 110 is the target of the a write operation. Measurement system 300 in optical system 170 measures the selected optical modes 132 and 162 in a manner that transfers quantum information to the selected matter system 110 and decouples the states of modes 132 and 162 from the selected matter system 110. FIGS. 3A to 3D illustrate examples of some suitable measurement systems and that perform the necessary measurements for write processes described further below.

Figure 4:
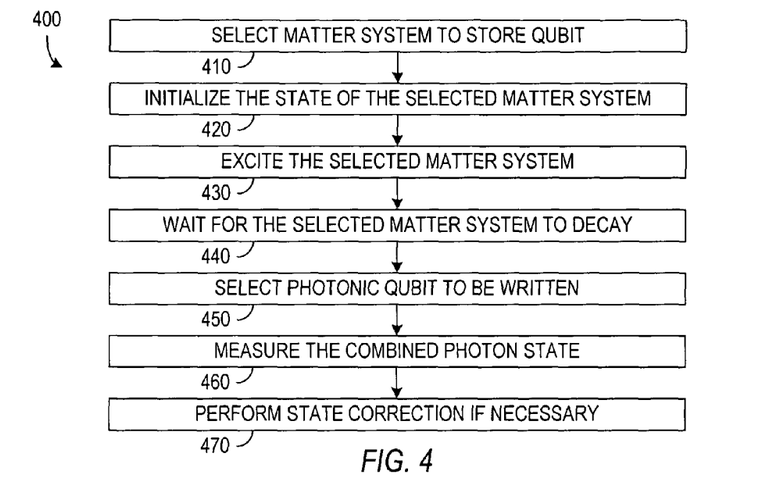
FIG. 4 is a flow diagram of a process for writing a quantum information originally represented using photon states into a matter system.

FIG. 4 illustrates a flow diagram of a write process 400 that system 100 of FIG. 1 can execute when writing photonic qubit $|q\rangle_p$ into one of matter systems 110. Process 400 begins in step 410 by selecting one of the matter systems 110 into which the qubit will be written. In system 100, optical network 154 selects the desired matter system 110-1 or 110-2 by providing an optical path for an emitted photon from the selected optical system 110-1 or 110-2 to measurement system 300. Step 420 then initializes the selected matter system 110 into a known state such as the diagonal state $|+\rangle_m$ shown in Equation 2. As will be understood from the following, other known states of the selected matter system 100 could alternatively be used with appropriate modification of the measurements or state corrections described below.

Equation 2:

$$|+\rangle_m = \frac{1}{\sqrt{2}}(|\uparrow\rangle + |\downarrow\rangle)$$

Excitation system 140 in step 430 applies a π-pulse to the selected matter system 110 to drive one or both of the basis states the matter system 110 to the associated excited state or states. As an illustrative example, the following assumes that matter systems 110 have the energy levels of FIG. 2A, so that step 430 drives the selected matter system to a state $|+\rangle'_m$ shown in Equation 3. Variations in the write process for systems using matter systems 110 with other energy levels, such as illustrated by the example of FIG. 2B, will be apparent to those of skill in the art in view of the present disclosure.

Equation 3:

$$|+\rangle'_m = \frac{1}{\sqrt{2}}(|\uparrow\rangle + |e\rangle) \xrightarrow{decay} \frac{1}{\sqrt{2}}(|\uparrow\rangle|0\rangle_e + |\downarrow\rangle|1\rangle_e)$$

During step 440, process 400 waits a period of time that is sufficient to provide a high probability of an excited state of matter system 110 to emit a photon and the surrounding cavity 120 to release any emitted photon to emission mode 130. As noted above, the matter system 110 decays by emitting a photon into the cavity mode to which the photon is coupled, and the cavity parameters of cavity 120 are preferably set so that with a high probability this cavity photon is then emitted into the corresponding emission mode 130. The wait time for step 440 generally needs to be such that any amplitude of excited state will with high probability have decayed and the cavity excitation will have been emitted by the end of wait step 440. Equation 3 shows the state resulting from the decay of the matter system 110 and release of a photon to the emission mode 130 of the matter system 110. In Equation 3, states $|0\rangle_e$ and $|1\rangle_e$ are the basis states of the modes 130 and 132 containing the emission from the selected matter system 110. An error caused by an excited state failing to decay or the cavity failing to release a photon to mode 130 within the allotted time of step 440 can be detected and corrected through encoding of quantum information as described further below.

Step 450 selects the photonic qubit to be written in the selected matter system 110 and directs photons associated with the selected qubit to input mode 162 of measurement system 300. System 100 can implement this selection using optical network 152 that provides an optical path for the selected photonic qubit to input mode 162. Equation 4 gives the state $|\psi\rangle$ of a system including the selected input mode 162, the selected matter system 110, and the corresponding emission mode 132 after step 450.

Equation 4:

$$|\psi\rangle = \frac{1}{\sqrt{2}}(|\uparrow\rangle|0\rangle_e + |\downarrow\rangle|1\rangle_e) \otimes \{c_0|0\rangle_p + c_1|1\rangle_p\}$$

$$= \frac{1}{\sqrt{2}}[(c_0|\uparrow 00\rangle + c_1|\downarrow 11\rangle) + (c_0|\downarrow 10\rangle + c_1|\uparrow 01\rangle)]$$

Measurement system 300 in step 460 measures the combined state of modes 132 and 162 to disentangle the photon states from the matter state in a manner that transfers quantum information to the matter state. FIGS. 3A, 3B, 3C, and 3D respectively illustrate different measurement systems 300A, 300B, 300C, and 300D, which are suitable for implementing alternative measurement processes in measurement step 460.

Figure 3A:
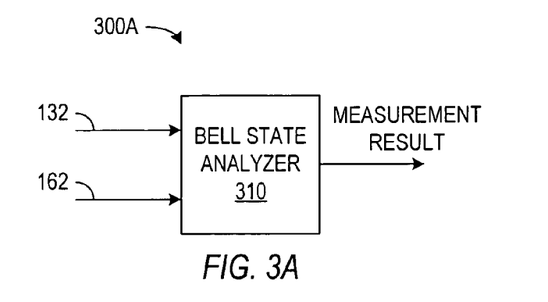
FIGS. 3A, 3B, 3C, and 3D show alternative measurement systems suitable for use in the system of FIG. 1.

FIG. 3A shows an exemplary measurement system 300A including a Bell state analyzer 310 that performs a Bell state measurement. S. D. Barrett, P. Kok, K. Nemoto, R. G. Beausoleil, W. J. Munro, and T. P. Spiller, Physical Review A, 71, 060302R (2005) and K. Nemoto and W. J. Munro, Phys. Rev. Let. 93, 250502 (2004) describe some suitable implementations of Bell state analyzers. The Bell state measurement performed on modes 132 and 162 projects state $|\psi\rangle$ of Equation 4 into Hilbert subspace that depends on the measurement results as indicated in Table 1. For example, a measurement result identifying that the combined state of modes 132 and 162 is the Bell state $(|00\rangle+|11\rangle)/\sqrt{2}$ projects the selected matter system 110 to the desired qubit state $c_0|\uparrow\rangle+c_1|\downarrow\rangle$. Measurement results identifying other Bell states project the selected matter system 110 into states such that one or more single qubit operations performed on the selected matter system 110 produce the desired state of the selected matter system.

Step 470 performs a state correction operation to transform the projected state. In an exemplary embodiment, the correction operation is a single qubit operation that can include one or more of a pass-through or no operation, a bit flip or equivalently a NOT operation, or a Z operation. The bit flip or NOT operation on a matter system interchanges basis states, e.g., $|\uparrow\rangle \leftrightarrow |\downarrow\rangle$. A Z operation introduces a relative sign change between basis states of a matter system, e.g., $|\uparrow\rangle \to |\uparrow\rangle$ and $|\downarrow\rangle \to -|\downarrow\rangle$. Table 1 indicates suitable state correction operations for the different measurement results from the Bell state measurement.

TABLE 1

Measurement Results and Required Correction

| Measured Bell State | Projected State of the Selected Matter System | State Correction Operation | |
|---|---|---|---|
| | | NOT | Z |
| $(|00\rangle + |11\rangle)/\sqrt{2}$ | $c_0|\uparrow\rangle + c_1|\downarrow\rangle$ | No | No |
| $(|00\rangle - |11\rangle)/\sqrt{2}$ | $c_0|\uparrow\rangle - c_1|\downarrow\rangle$ | No | Yes |
| $(|01\rangle + |10\rangle)/\sqrt{2}$ | $c_0|\downarrow\rangle + c_1|\uparrow\rangle$ | Yes | No |
| $(|01\rangle - |10\rangle)/\sqrt{2}$ | $c_0|\downarrow\rangle - c_1|\uparrow\rangle$ | Yes | Yes |

Figure 3B:
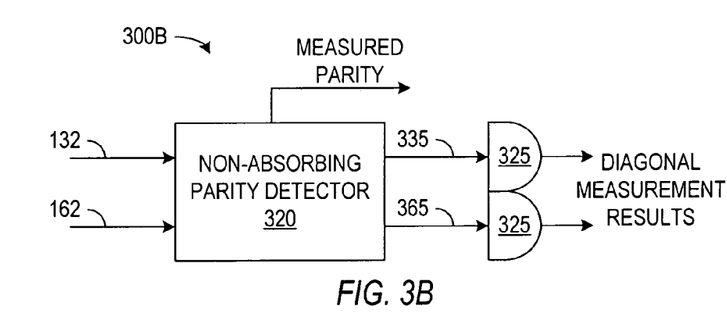

An alternative measurement technique for step 460 uses measurement system 300B of FIG. 3B to measure a parity of the combined state of modes 132 and 162 and then measure the projections of resulting states of parity-measured modes 335 and 365 onto diagonal basis states of modes 335 and 365. To implement these measurements, measurement system 300B includes a non-absorbing parity detector 320 and detectors 325 for measurement of modes 335 and 365 in respective diagonal bases. The operation and implementation of non-absorbing parity detector 320 depends on the representation used for qubits in modes 132 and 162. For example, using single rail representations in both photon modes 132 and 162, parity detector 320 can measure whether modes 132 and 162 collectively contain an even number or an odd number of photons, but without determining the total number of photons. W. J. Munro, K. Nemoto, R. G. Beausoleil, and T. P. Spiller, Phys. Rev. A 71, 033819 (2005) describes techniques and systems for implementing parity measurements of this type. The parity measurement projects state $|\psi\rangle$ of Equation 4 into a Hilbert subspace that depends on the measurement results.

Detectors 325 then measures photon modes 335 and 365 in respective diagonal bases. For example, the projection of the state of mode 335 onto a state $|+\rangle=(|0\rangle+|1\rangle)/\sqrt{2}$ or $|-\rangle=(|0\rangle-|1\rangle)/\sqrt{2}$. The implementation of detectors 325 that perform the diagonal measurements depends on the basis used in the parity measured modes 335 and 365. For a polarization representation having basis states $|H\rangle$ and $|V\rangle$, each detector 325 can be simply implemented using a polarizer with a polarization axis 45° from horizontal and a photon detector capable of detecting single photons. For a single rail basis, a light-light converter such as described in U.S. patent application Ser. No. 10/837,129, entitled "Quantum Optical State Converter," can convert the states of modes 132 to a polarization representation for measurement as described above. Alternatively a detector such as described by A. P. Lund and T. C. Relph, Phys. Rev. A 66, 032307 (2004) can directly measure mode 335 or 365 in a diagonal basis of a single-rail representation.

The results of the parity measurement and the diagonal measurements indicate what single qubit operations (if any) step 470 must execute to place the selected matter system 110 in the desired state. For example, Table 2, which illustrates the example of using a parity measurement and the projections onto respective states $|+\rangle$ to disentangle the matter state from the photon states, indicates suitable state corrections corresponding to the different measurement results.

TABLE 2

Measurement Results using Parity Measurement and Required Correction

| Parity Measurement Result and State | Diagonal Measurement | | State Correction Operation | |
|---|---|---|---|---|
| | Results | State | NOT | Z |
| Even $c_0|\uparrow\rangle|00\rangle + c_1|\downarrow\rangle|11\rangle$ | ++ | $c_0|\uparrow\rangle + c_1|\downarrow\rangle$ | No | No |
| | +− | $c_0|\uparrow\rangle - c_1|\downarrow\rangle$ | No | Yes |
| Odd $c_0|\downarrow\rangle|10\rangle + c_1|\uparrow\rangle|01\rangle$ | −− | $c_0|\downarrow\rangle + c_1|\uparrow\rangle$ | Yes | No |
| | −+ | $c_0|\downarrow\rangle - c_1|\uparrow\rangle$ | Yes | Yes |

Figure 3C:
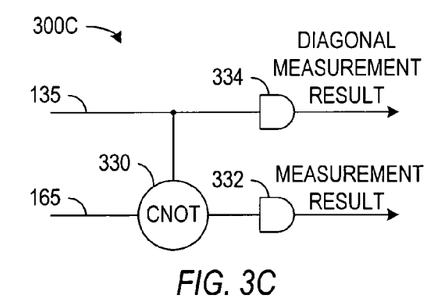

FIG. 3C shows a measurement system 300C that uses a controlled NOT gate 330 and detectors 332 and 334 to disentangle the states of photon modes 132 and 162 from the state of the selected matter system 110. CNOT gate 330 transforms the state $|\psi\rangle$ of the combined system as indicated in Equation 5. Detector 332 then measures whether target mode 162 is in state $|0\rangle_p$ or $|1\rangle_p$. A measurement result 0 or 1 for mode 162 projects system state $|\psi\rangle$ to a corresponding projected state indicated in Table 3. Detector 334 measures the projection of the state of control mode 132 onto a diagonal basis state, e.g., onto $(|0\rangle_e+|1\rangle_e)/\sqrt{2}$, to disentangle the photon modes 132 and 162 from the selected matter system 110. The four different combinations of results from measuring the control and target modes indicate which state operations are require to produce the desired state.

Equation 5:

$$|\psi\rangle \to \frac{1}{\sqrt{2}}[c_0|\uparrow 00\rangle + c_1|\downarrow 10\rangle + c_0|\downarrow 11\rangle + c_1|\uparrow 01\rangle]$$

TABLE 3

| Target Mode Result | Projected State | Control Mode Result | State | Correction Operations |
|---|---|---|---|---|
| 0 | $c_0|\uparrow 0\rangle + c_1|\downarrow 1\rangle$ | + | $c_0|\uparrow\rangle + c_1|\downarrow\rangle$ | None |
|  |  | − | $c_0|\uparrow\rangle - c_1|\downarrow\rangle$ | Z |
| 1 | $c_0|\downarrow 1\rangle + c_1|\uparrow 0\rangle$ | + | $c_0|\downarrow\rangle + c_1|\uparrow\rangle$ | NOT |
|  |  | − | $-c_0|\downarrow\rangle + c_1|\uparrow\rangle$ | NOT & Z |

Figure 3D:
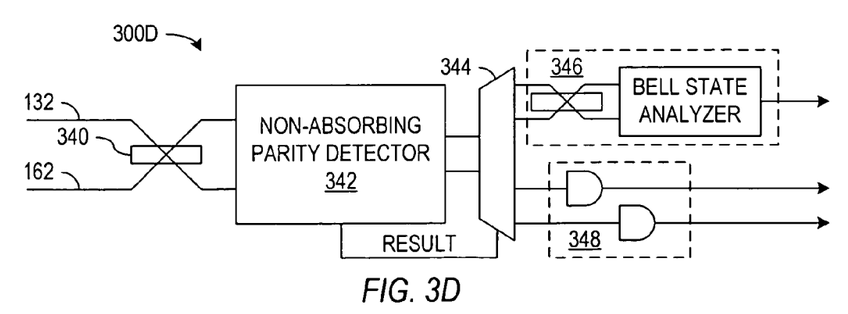

FIG. 3D illustrates yet another measurement system 300D capable of executing measurement step 460. For this embodiment, the measurement in step 460 begins by directing modes 132 and 162 into a 50-50 beam splitter 340, which transforms the systems state $|\psi\rangle$ of Equation 4 as indicated in Equation 6 for photon basis states of a single-rail representation. A non-absorbing parity detector 342 distinguishes states have only 0 or 2 photons in each mode from states having one photon in one of the output modes of beam splitter 340. This measurement projects the system state to either the term in the first or second square bracket on the right hand side of Equation 6. An optical switch 344 under control of this parity measurement result directs the photon modes to a measurement system 346 if each mode has an even number of photons or to a measurement system 348 if at least one mode has exactly one photon. Accordingly, measurement system 346 operates on a state corresponding to the first set of square brackets in Equation 6, and measurement system 348 operates on a state corresponding to the set of second square brackets in Equation 6.

Equation 6:

$$|\psi\rangle \to \begin{bmatrix} c_0|00\rangle|\uparrow\rangle + \\ \frac{c_1}{\sqrt{2}}\{|02\rangle - |20\rangle\}|\downarrow\rangle \end{bmatrix} + \begin{bmatrix} \frac{c_0}{\sqrt{2}}\{|01\rangle - |10\rangle\}|\downarrow\rangle + \\ \frac{c_1}{\sqrt{2}}\{|01\rangle + |10\rangle\}|\uparrow\rangle \end{bmatrix}$$

Measurement system 346 includes a 50-50 beam splitter and a Bell state analyzer. The component state with 0 or 2 photons passes through the beam splitter producing a state $c_0|00\rangle + c_1|11\rangle$. It is therefore known that only one of two (out of a possible four) Bell states can result, so that the Bell state analyzer in measurement system 346, which only needs to distinguish between two Bell states, may be less complex than the Bell state analyzer 310 of FIG. 3A. The measurement result from Bell state analyzer in system 346 thus distinguishes one of the upper two states in Table 1, and the two rows of Table 1 give the resultant states and corrections associated with measurement results from system 346.

Measurement system 348 measures each light mode from switch 344. These measurements should be performed in the basis $\{|0\rangle,|1\rangle\}$ of Equation 6, which effectively measures in the diagonal basis of the original input modes 135 and 165 because of the effect of beam-splitter 340. There is one and only one photon detected by system 348 and therefore only two possible measurement outcomes corresponding to states $|01\rangle$ and $|10\rangle$, and system 348 can use any detectors capable of distinguish states $|01\rangle$ and $|10\rangle$. For example, system 348 could use detectors that resolve photon number, but even simple "bucket" detectors that just distinguish between the vacuum and non-vacuum states will do. In system 348, the measurement result identifying state $|01\rangle$ yields the projected state of row 3 of Table 1, which requires state correction as indicated row 3 of Table 1. The other measurement result yields the state of row 4 of Table 1, which similarly requires state correction as indicated row 4 of Table 1.

Figure 5:
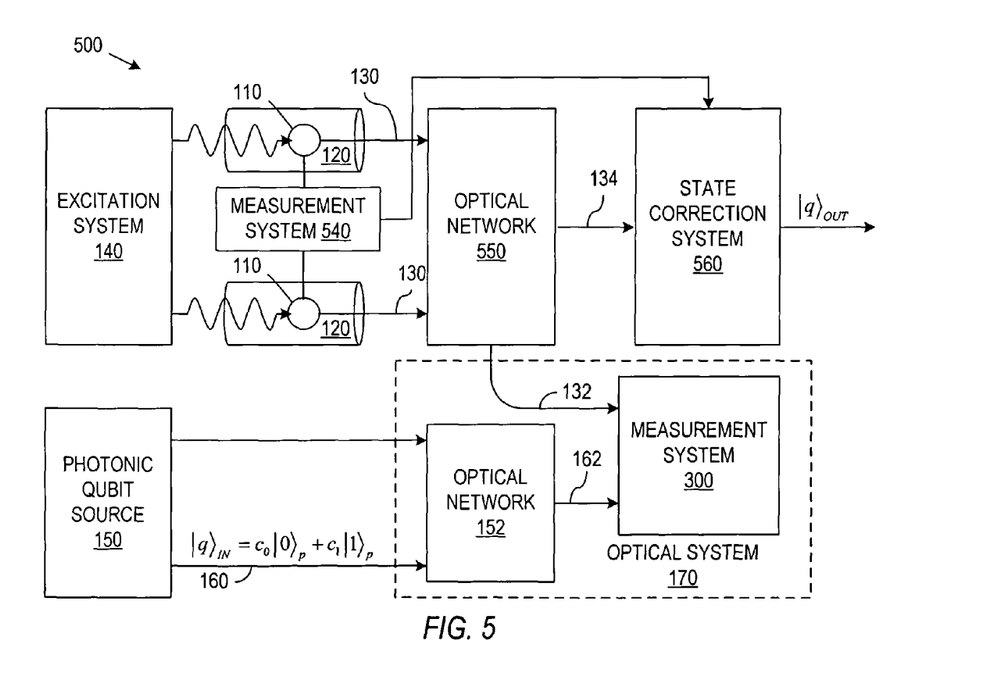
FIG. 5 shows a system in accordance with an embodiment of the invention able to transfer quantum information between a representation using quantum states of a matter system and a representation using photon states.

Reading quantum information from matter systems to light systems can employ systems and techniques similar to those described for the write operation above. FIG. 5, for example, is a block diagram of a quantum coherent system 500 including the components that enable writing quantum information from a photonic state $|q\rangle_{IN}$ of an input mode 160 to a matter system 110. Accordingly, a write operation can be performed in system 500 using, for example, process 400 of FIG. 4. System 500 is further capable of producing a photonic qubit $|q\rangle_{OUT}$ representing information read from a matter system 110. As described above, matter systems 110 in system 500 are contained in respective optical cavities 120 having preferred emission modes 130. An excitation system 140, also as described above, can selectively excite matter systems 110, so that decays of the excited state(s), e.g., state $|e\rangle$ or states $|\uparrow e\rangle$ and $|\downarrow e\rangle$, create an entangled quantum state of an emission mode 130 and the corresponding matter system 110. An optical network 550, which replaces optical network 154 of FIG. 1, can select a matter system 110 for a read or write process by selecting one of emission modes 130 and select whether a write or read is performed by routing photons from the selected emission mode to measurement system 300 or to a state correction system 560.

System 500 further includes a measurement system 540 capable of measuring the state of the selected matter system 110. The specific implementation of measurement system 540 in general depends on matter systems 110 and the representation that matter systems 110 uses to represent quantum information. Measurement systems are well known in the field of quantum information processing for a variety of matter systems including system using NV-diamond defects as in the exemplary embodiment of the present invention. See, for example, Jelezko et al., Phys. Rev. Lett. 92, 076401 (2004) and Nizovtsev et al., Optics and Spectroscopy 99, 233 (2005). During a read operation described further below, measurement results from measurement system 540 control whether state correction system 560 changes the state of mode 134 to produce the desired output photon state $|q\rangle_{OUT}$.

Figure 6:
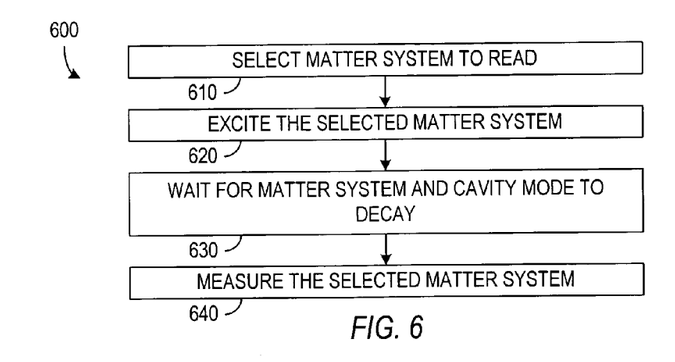
FIG. 6 is a flow diagram of a process for reading quantum information from a matter system to encode the quantum information using a photon state.

FIG. 6 is a flow diagram of a read process 600 that can be executed using system 500. In step 610 of process 600, a matter system 110 is selected, e.g., through operation of optical network 550 to provide a path for emitted photons from the selected matter system 110 to an output mode 134. The selected matter system 110 is assumed to be in a state $|q\rangle_m$ representing a qubit to be read. Equation 7 indicates the general form of a matter qubit, where $c_0$ and $c_1$ are complex coefficients subject to a normalization requirement.

$$|q\rangle_m = c_0|\uparrow\rangle + c_1|\downarrow\rangle \qquad \text{Equation 7}$$

Excitation system 140 in step 620 generates a π-pulse or otherwise excites the selected matter system 110, and then step 630 waits for photon emissions from decays of the excited states. The excitation and decay produces an entangled state of matter system 110 and photon mode 134 as indicated in Equation 8A or 8B, depending on whether one or both of the basis states of the matter system have corresponding excited states.

Equation 8A:

$$|q\rangle_m \xrightarrow{excite} c_0|\uparrow\rangle + c_1|e\rangle \xrightarrow{decay} c_0|\uparrow\rangle|0\rangle_e + c_1|\downarrow\rangle|1\rangle_e$$

Equation 8B:

$$|q\rangle_m \xrightarrow{excite} c_0|\uparrow e\rangle + c_1|\downarrow e\rangle \xrightarrow{decay} c_0|\uparrow\rangle|H\rangle_e + c_1|\downarrow\rangle|V\rangle_e$$

Step 640 measures the selected matter system 110 in a diagonal basis, using the measurement system 540. If the measurement in the diagonal basis indicates the selected matter system 110 is in state $(|\uparrow\rangle+|0\rangle)/\sqrt{2}$, the desired photon state $|q\rangle_{OUT}$ has been produced without the need for state correction. If the measurement in the diagonal basis indicates the selected matter system 110 is in state $(|\uparrow\rangle-|\downarrow\rangle)/\sqrt{2}$, state correction system 560 performs a Z operation on the photon state to produce the desired photon state $|q\rangle_{OUT}$. For a photon state, the Z operation introduces a sign change between the basis states, e.g., $|0\rangle \rightarrow |0\rangle$ and $|1\rangle \rightarrow -|1\rangle$ or $|H\rangle \rightarrow |H\rangle$ and $|V\rangle \rightarrow -|V\rangle$ depending on the basis states used.

Figure 7:
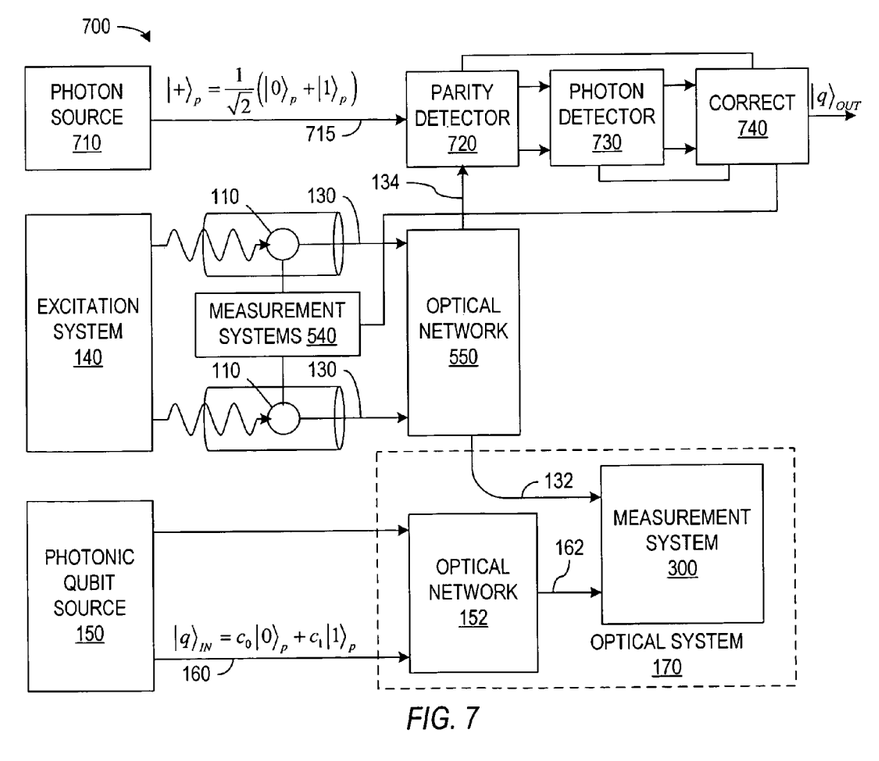
FIG. 7 shows a system in accordance with an embodiment of the invention able to read and write quantum information.

FIG. 7 shows an alternative quantum coherent system 700 that uses an auxiliary photon state for a read operation that produces a qubit represented by an entangled state of two light modes. System 700 includes matter systems 110, optical cavities 120, an excitation system 140, an optical network 550, and a measurement system 540 as described above. A photon source 710 produces the auxiliary photon, which has a known state, e.g., $|+\rangle_p=(|0\rangle_p+|1\rangle_p)/\sqrt{2}$, of a photon mode 715. A parity detector 720, a photon detector 730, and a state correction system 740 measure and manipulate the photon modes 134 and 715 as needed during a read process to produce a desired output state representing the qubit read.

Figure 8:
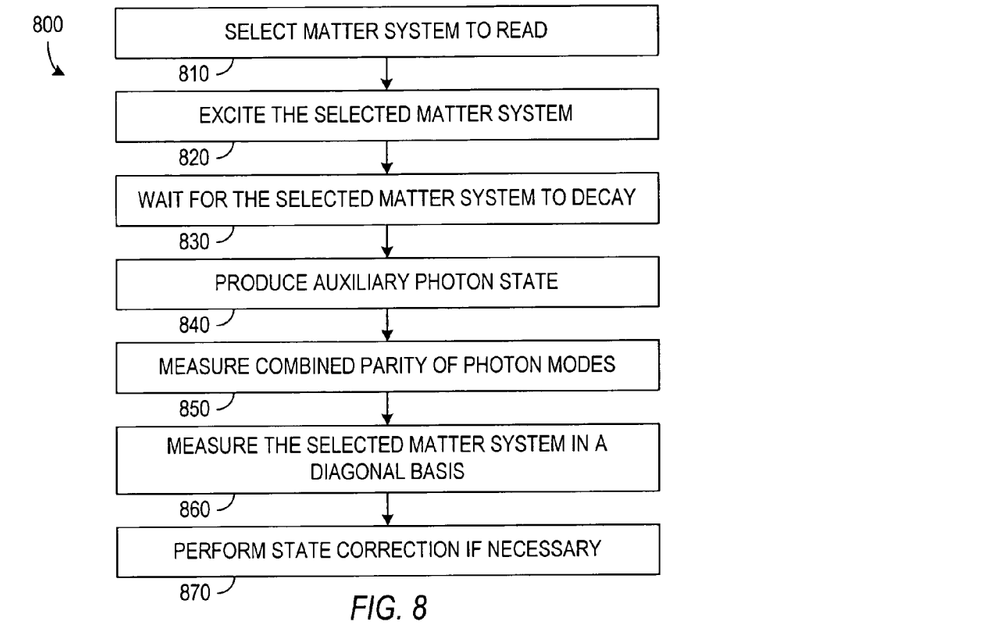
FIG. 8 is a flow diagram of a process for reading quantum information from a matter system to encode the quantum information using entangled photon states.

FIG. 8 is a flow diagram of a read process 800 that can be executed using system 700 of FIG. 7. Read process 800 starts with a step 810 of selecting a matter system 110 to read. Optical network 550 can select the matter system 110 by providing a path to mode 134 for photons emitted from the cavity 120 containing the selected matter system 110. In step 820, excitation system 140 excites the selected matter system 110, which subsequently decays during step 830. Entangled matter-light states such as shown in Equations 8A and 8B above thus result at step 830.

Step 840 then uses photon source 710 to produce an auxiliary photon in a known state. Equation 9 shows the resulting-states of system 700 for a single rail representation in the photon modes 134 and 715 when the known state of the auxiliary photon mode is in state $|+\rangle_p$. Alternatively, the read operation could use other known states for the auxiliary mode 715 or alternative qubit representations with appropriate modifications to the subsequent measurements or state correction as described below.

Equation 9:

$$|\psi\rangle = [c_0|\uparrow\rangle|0\rangle_e + c_1|\downarrow\rangle|1\rangle_e] \otimes \frac{1}{\sqrt{2}}[|0\rangle_p + |1\rangle_p]$$

$$= \frac{1}{\sqrt{2}}[c_0|\uparrow 00\rangle + c_0|\uparrow 01\rangle + c_1|\downarrow 10\rangle + c_1|\downarrow 11\rangle]$$

Non-absorbing parity detector 720 in step 850 measures the combined parity of photon modes 134 and 715. The parity measurement projects system state $|\psi\rangle$ into one of two states with the parity measurement result identifying the state. Table 4 shows the states associated with even and odd measurement results for an example of read operation 800. Step 860 then measures the selected matter system 110 in a diagonal basis, which decouples the state of matter system 110 from the states of photon modes 715 and 134. As a result of the measurements in steps 850 and 860, photon modes 715 and 134 will be in one of four states, with the specific state being heralded by the results of the parity and diagonal measurements. Correction system 740 in step 870 can perform operations that transform the heralded state to the desired qubit state represented with entangled photons. Table 4 shows the correction operations for the exemplary embodiment of the invention.

TABLE 4

| Parity Measured Result and Resulting State | | Diagonal Measurement Result and Resulting State | | State Correction |
|---|---|---|---|---|
| Even | $c_0|\uparrow 00\rangle + c_1|\downarrow 11\rangle$ | D0 | $c_0|00\rangle + c_1|11\rangle$ | None |
|  |  | D1 | $c_0|00\rangle - c_1|11\rangle$ | Z on one mode |
| Odd | $c_0|\uparrow 01\rangle + c_1|\downarrow 10\rangle$ | D0 | $c_0|01\rangle + c_1|10\rangle$ | Bit flip on p |
|  |  | D1 | $c_0|01\rangle - c_1|10\rangle$ | Z on one mode & Bit flip on p |

The above described read and write operation have illustrated examples of writing to or reading from a single matter system. The writing or reading can be of quantum information that corresponds to a quantum state that is entangled with the states of other systems. In particular, the write and read operations work on a qubit that is entangled with one or more qubits that may or may not get written or read. Also, quantum information associated with the states of photons which are entangled with other systems (not shown) of any type can be written into matter qubits, which will leave the matter qubits entangled with the other systems. Similarly, matter qubits that are entangled with other systems can be read to produce photon states that are entangled with the other systems. Further, two or more read or write operations can be conducted in parallel on light and matter systems, and the states being written or read can be entangled states. For example, a multi-qubit photonic entangled state could be written fully or partially, i.e., just some of the photonic qubits, into matter qubits, while the write operation preserves the entanglement. Similarly, a multi-qubit entangled matter state could be read fully or partially into photonic qubits. The excitations and decays of the matter systems also permit simple creation of entangled states of matter systems and photon modes.

In accordance with a further aspect of the invention, the ability to read and write entangled qubits in matter systems and create entangled matter-light states permits encoding of qubits or other quantum information in entangled matter-light states that facilitate error correction. More specifically, quantum information can be encoded using entangled states of matter-light systems that permit performing operations on photon states and quantum information recovery using measurements of the matter systems when one or more photons is lost.

Equations 10 show one example of basis states $|0\rangle_L$ and $|1\rangle_L$ for a qubit encoding that uses entanglements among two matter systems and the two associated photon emission modes. Equation 11 shows how quantum information associated with qubit coefficients $c_0$ and $c_1$ is related to basis states $|0\rangle_L$ and $|1\rangle_L$ in an encoded state $|q\rangle_L$ or equivalently with a density matrix $\rho$.

Equations 10:

$$|0\rangle_L = \frac{1}{\sqrt{2}}[|\uparrow H\rangle + |\downarrow V\rangle] \otimes \frac{1}{\sqrt{2}}[|\uparrow H\rangle + |\downarrow V\rangle] \equiv |0\rangle_{L1} \otimes |0\rangle_{L2}$$

$$|1\rangle_L = \frac{1}{\sqrt{2}}[|\uparrow H\rangle - |\downarrow V\rangle] \otimes \frac{1}{\sqrt{2}}[|\uparrow H\rangle - |\downarrow V\rangle] \equiv |1\rangle_{L1} \otimes |1\rangle_{L2}$$

Equations 11:

$$|q\rangle_L = c_0|0\rangle_L + c_1|1\rangle_L$$

$$\rho = |c_0|^2|0\rangle_L\langle 0|_L + c_0c_1^*|0\rangle_L\langle 1|_L + c_0^*c_1|1\rangle_L\langle 0|_L + |c_1|^2|1\rangle_L\langle 1|_L$$

$$\equiv |c_0|^2|0\rangle_{L1}|0\rangle_{L2}\langle 0|_{L2}\langle 0|_{L1} + c_0c_1^*|0\rangle_{L1}|0\rangle_{L2}\langle 1|_{L2}\langle 1|_{L1} +$$

$$c_0^*c_1|1\rangle_{L1}|1\rangle_{L2}\langle 0|_{L1} + |c_1|^2|1\rangle_{L1}|1\rangle_{L1}|1\rangle_{L2}\langle 1|_{L2}\langle 1|_{L1}$$

Figure 9:
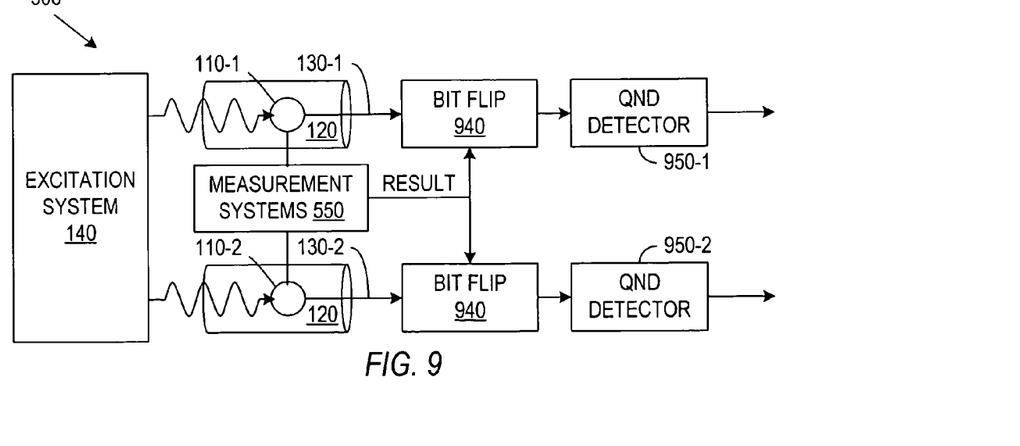
FIG. 9 is a block diagram of a system for error resistant encoding a qubit using entangled states of matter and light.

The encoded qubit of Equation 11 can be physically embodied in a quantum coherent system such as system 900 of FIG. 9. System 900 includes matter systems 110-1 and 110-2 in cavities 120 with respective emission modes 130-1 and 130-2 as described above. To simplify implementation of the basis states of Equation 10, each matter system 110 is of a type having two excited states $|e\uparrow\rangle$ and $|e\downarrow\rangle$ respectively associated with states $|\uparrow\rangle$ and $|\downarrow\rangle$ as illustrated in FIG. 2B, so that after being excited, matters systems 110 emit photons in respective polarized states $|H\rangle$ and $|V\rangle$ of emission modes 130. Basis state $|0\rangle_L$ can be simply created in system 900 by setting each of matter systems 130-1 and 130-2 in state $|+\rangle_m$, using excitation system 140 to excite the matter system 110, and waiting for the excited states to decay and the cavity to release a photon to the emission mode. Basis state $|1\rangle_L$ can be created in system 900 by setting each of matter systems 110-1 and 110-2 in state $|-\rangle_m$, using excitation system 140 to excite the matter system 110 and waiting for the excited states and cavity mode to decay.

Figure 10:
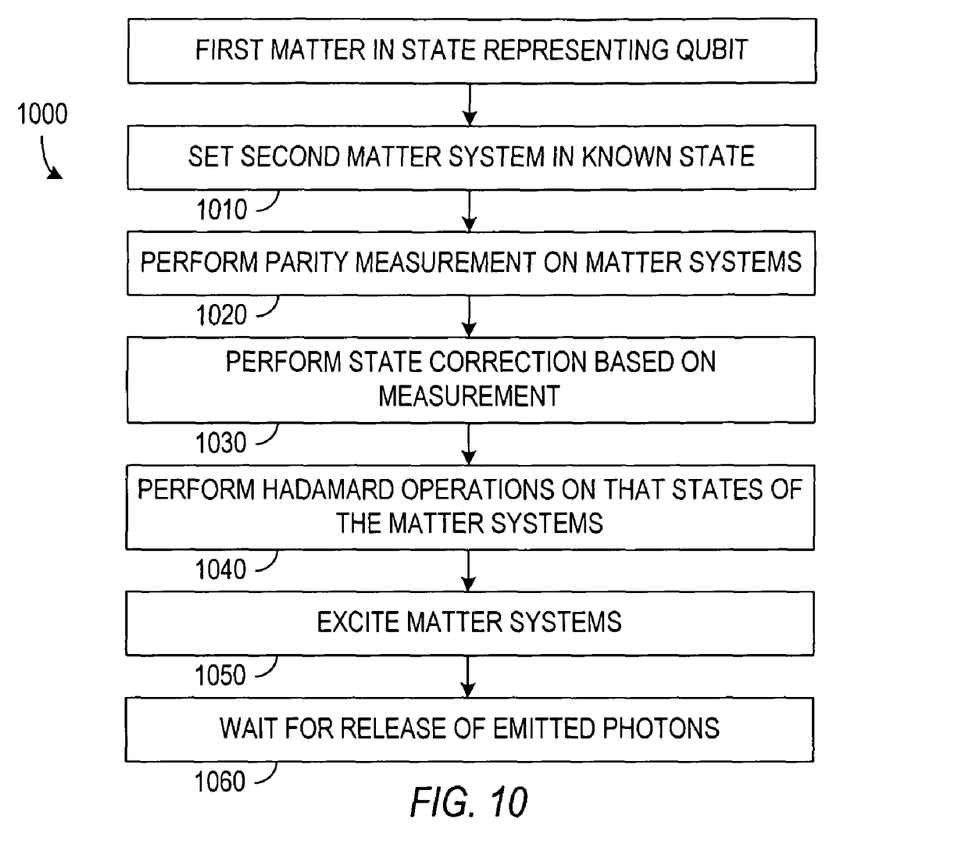
FIG. 10 is a flow diagram illustrating a process for encoding quantum information using entangled states of matter and light.

FIG. 10 is a flow diagram of a process 1000 for converting a qubit represented by a state $c_0|\uparrow\rangle_1+c_1|\downarrow\rangle_1$ of a first matter system 110-1 to an encoding that uses the states of matter and light systems. Process 1000 illustrates an example where the encoding uses two matter systems and associated emission modes as shown in Equations 11, but as described further below other encodings using other combinations of matter and light states can be constructed using similar techniques. In the exemplary embodiment, process 1000 begins with a step 1010 of setting a second matter system 110-2 into a known state that is combination of the basis states of the second matter system 110-2, e.g., in state $|+\rangle_2=(|\uparrow\rangle_2+|\downarrow\rangle_2)/\sqrt{2}$.

Step 1020 performs a parity measurement on the combined state of matter systems 110-1 and 110-2. The parity measurement can be performed using the emitted photons after excitation of matter systems 110, and a destructive photon measurement is acceptable here as long as the measurement does not distinguish the source of photons. An even parity measurement result indicates matter systems 110-1 and 110-2 are in a state $c_0|\uparrow\uparrow\rangle+c_1|\downarrow\downarrow\rangle$, while an odd parity measurement results indicates matter systems 110-1 and 110-2 are in a state $c_0|\uparrow\downarrow\rangle+c_1|\downarrow\uparrow\rangle$. Step 1030, which performs state correction, performs a bit flip or NOT operation on matter system 110-2 only if parity measurement 1020 found odd parity, so that after step 1030, matter systems 110-1 and 110-2 are in a state $c_0|\uparrow\uparrow\rangle+c_1|\downarrow\downarrow\rangle$ regardless of the previous measurement result.

Step 1040 performs a Hadamard operation on the state of each of matter systems 110-1 and 110-2. Matter systems 110-1 and 110-2 are then in a state $$c_0\frac{1}{\sqrt{2}}(|\uparrow\rangle_1+|\downarrow\rangle_1)\otimes\frac{1}{\sqrt{2}}(|\uparrow\rangle_2+|\downarrow\rangle_2)+$$

$$c_1\frac{1}{\sqrt{2}}(|\uparrow\rangle_1-|\downarrow\rangle_1)\otimes\frac{1}{\sqrt{2}}(|\uparrow\rangle_2-|\downarrow\rangle_2).$$

Step 1050 can then excite matter systems 110, and the desired encoded qubit of Equation 11 is produced after waiting in step 1060 for the release of photons from cavities 120 to emission modes 130.

Process 1000 can be generalized to use more matter systems 110 in the encoding of a qubit. For example, step 1010 can set N-1 matter systems 110-2 to 110-N in an entangled state $(|\uparrow\rangle_2\ldots|\uparrow\rangle_N+|\downarrow\rangle_2\ldots|\downarrow\rangle_N)/\sqrt{2}$, and then this entangled state is further entangled by the parity measurement of step 1020 with the qubit to be encoded. State correction step 1030 in this case produces a state $c_0|\uparrow\rangle_1|\uparrow\rangle_2\ldots|\uparrow\rangle_N+c_1|\downarrow\rangle_1|\downarrow\rangle_2\ldots|\downarrow\rangle_N$, which can be converted to an encoding using up to N matter systems 110 and N associated emission modes 130.

Each emission mode 130, in the exemplary embodiment, uses basis states $|H\rangle$ and $|V\rangle$ for a polarization representation. The polarization representation allows each quantum non-demolition (QND) detector 950-1 or 950-2 of FIG. 9 to detect whether a measured mode 130-1 or 130-2 contains a photon while still preserving the quantum information that the polarization state of the mode 130-1 or 130-2 represents. QND detectors 950 can thus detect an error, for example, corresponding to loss of a photon or a failure of an excited state to decay within an allotted time. With a non-demolition detection, such as described by W. J. Munro, K. Nemoto, R. G. Beausoleil, and T. P. Spiller, Phys. Rev. A 71, 033819 (2005), G. J. Milburn and D. F. Walls, Phys. Rev A 30, 56 (1984), or N. Imoto, H. A. Haus, and Y. Yamamoto, Phys. Rev. A 32, 2287 (1985), the measurement does not disrupt quantum operations on the emission modes if no error is detected.

It can be shown that quantum information, e.g., coefficients $c_0$ and $c_1$ can be recovered from encoded qubit $|q\rangle_L$ even when a photon is lost from either or both of photon modes 130. For example, if QND detector 950-2 identifies that a photon is lost from mode 130-2 when system 300 originally encoded a qubit corresponding to density matrix $\rho$ of Equation 11, system 900 will then be in incoherent state corresponding to the unnormalized density matrix $\rho'$ shown in Equation 12. A coherent state containing the original quantum information can be recovered through measurements of matter systems 110. For example, measurement systems 550 can measure matter system 110-2 is in a diagonal basis. If the measurement result indicates matter system 110-2 is in a state $$|+\rangle = \frac{1}{\sqrt{2}}(|\uparrow\rangle+|\downarrow\rangle),$$

system 900 will have a density matrix $\rho^+$ of the form of Equation 13, which corresponds to coherent state $c_0|0\rangle_{L1}-c_1|1\rangle_{L1}$. A Z operation can recovers the original quantum information in a representation using basis states $|0\rangle_{L1}$ and $|1\rangle_{L1}$. If the result of the measurement in the diagonal basis indicates matter system 110-2 is in a state $$|-\rangle = \frac{1}{\sqrt{2}}(|\uparrow\rangle - |\downarrow\rangle),$$

system 900 will have a density matrix $\rho^-$ of the form of Equation 14, which corresponds to state $c_0|0\rangle_{L1} + c_1|1\rangle_{L1}$ and recovers the original quantum information.

$$\rho' = |c_0|^2 |0\rangle_{L1}\langle 0|_{L1} \otimes (|\uparrow\rangle_2\langle\uparrow|_2 + |\downarrow\rangle_2\langle\downarrow|_2) + c_0 c_1^*$$
$$*|0\rangle_{L1}\langle 1|_{L1} \otimes (|\uparrow\rangle_2\langle\uparrow|_2 - |\downarrow\rangle_2\langle\downarrow|_2) + c_0^*$$
$$*c_1|1\rangle_{L1}\langle 0|_{L1} \otimes (|\uparrow\rangle_2\langle|_2 - |\downarrow\rangle_2\langle\downarrow|_2) +$$
$$|c_1|^2|1\rangle_{L1}\langle 1|_{L1} \otimes (|\uparrow\rangle_2\langle\uparrow|_2 + |\downarrow\rangle_2\langle\downarrow|_2) \quad \text{Equation 12}$$

$$\rho^+ = |c_0|^2|0\rangle_{L1}\langle 0|_{L1} - c_0 c_1^* |0\rangle_{L1}\langle 1|_{L1} - c_0^*$$
$$*c_1|1\rangle_{L1}\langle 0|_{L1} + |c_1|^2|1\rangle_{L1}\langle 1|_{L1} \quad \text{Equation 13}$$

$$\rho^- = |c_0|^2|0\rangle_{L1}\langle 0|_{L1} + c_0 c_1^* |0\rangle_{L1}\langle 1|_{L1} + c_0^*$$
$$*c_1|1\rangle_{L1}\langle 0|_{L1} + |c_1|^2|1\rangle_{L1}\langle 1|_{L1} \quad \text{Equation 14}$$

In the encoding of Equations 10 and 11 above, each basis state $|0\rangle_L$ or $|1\rangle_L$ is a product of an entangled state $|0\rangle_{L1}$ or $|1\rangle_{L1}$ of a first matter system 110-1 and its emission mode 130-1 and an entangled state $|0\rangle_{L2}$ or $|1\rangle_{L2}$ of a second matter system 110-2 and its emission mode 130-2. Similar basis states for encoded qubits can be constructed as a product of three or more states, each of which is an entangled state of a matter system 110 and the associated emission mode 130. This type of encoding can recover quantum information even after the loss of two or more photons by performing diagonal measurements on the matter systems associated with the emission modes that lost photons. After a state correction that the measurement results identify, the resulting state encodes the original quantum information using a basis that is a product of a smaller number of entangled states.

Another alternative encoding basis may use a product including an unentangled state of a matter system as shown in Equations 15. Even if all photons are lost from the entangled emission modes, measurements of matter systems that were entangled with the lost photons can be measured to set the unentangled matter system in a state representing the original quantum information.

Equation 15:

$$|0\rangle_L = \frac{1}{\sqrt{2}}[|\uparrow\rangle + |\downarrow\rangle] \otimes \frac{1}{\sqrt{2}}[|\uparrow H\rangle + |\downarrow V\rangle] \ldots \otimes \frac{1}{\sqrt{2}}[|\uparrow H\rangle + |\downarrow V\rangle]$$

$$|1\rangle_L = \frac{1}{\sqrt{2}}[|\uparrow\rangle - |\downarrow\rangle] \otimes \frac{1}{\sqrt{2}}[|\uparrow H\rangle - |\downarrow V\rangle] \ldots \otimes \frac{1}{\sqrt{2}}[|\uparrow H\rangle - |\downarrow V\rangle]$$

Although the invention has been described with reference to particular embodiments, the description is only an example of the invention's application and should not be taken as a limitation. For example, the read and write processes, which apply to qubits which may or may not be entangled with other systems, have been described separately, but they could be combined. In particular, light qubits could be written into matter systems and then read back out into other light qubits that could have different physical properties. Similarly, matter qubits could be read into light and then written back into some other matter qubits that could have different physical properties, e.g., different locations. Additionally, the principles of the invention illustrated for qubits are not limited to binary quantum information but can be generalized for other forms of quantum information such as qudit or qunat. Various other adaptations and combinations of features of the embodiments disclosed are within the scope of the invention as defined by the following claims.

What is claimed is:

1. A process comprising:
    producing a photonic state of an input mode, wherein the photonic state represents quantum information to be written into a matter system;
    initializing the matter system in a known state that is a combination of a first basis state and a second basis state;
    applying to the matter system an excitation capable of exciting at least one of the first and second basis states to a corresponding excited state; and
    measuring a combined state of the input mode and an emission mode of the matter system, wherein the measuring of the combined state is such that states of the emission mode and the matter system become disentangled and the state of the matter system depends on the quantum information.

2. The process of claim 1, further comprising after applying the excitation to the matter system, waiting a period of time such that a photon emitted by decay of the excited state is likely to enter the emission mode.

3. The process of claim 1, wherein measuring the combined state comprises determining the combined state is a Bell state.

4. The process of claim 1, wherein measuring the combined state comprises:
    measuring a parity of the combined state; and
    measuring a state of one of the input mode and the emission mode in a diagonal basis.

5. The process of claim 1, wherein measuring the combined state comprises:
    applying one of the input mode and the emission mode to control a CNOT gate through which the other of the input mode and the emission mode passes; and
    measuring a state of one of the input mode and the emission mode in a diagonal basis.

6. The process of claim 1, wherein measuring the combined state comprises:
    applying the input mode and the emission mode to a first beam splitter;
    measuring parity of a state of output modes of the first beam splitter;
    in response to measuring an even parity, directing the output modes of the first beam splitter to input modes of a second beam splitter and identifying a state of output modes of the second beam splitter as corresponding to a Bell state; and
    in response to measuring an odd parity, measuring the state of the output modes of the first beam splitter.

7. The process of claim 6, further comprising performing a state correction operation on the matter system, wherein the state correction operation is selected according to results from measuring the output modes of one of the first beam splitter and the second beam splitter.

8. The process of claim 1, further comprising performing on the matter system a state correction operation, wherein the state correction operation performed depends on results of the measuring of the combined state.

9. The process of claim 1, wherein the photonic state of the input mode is part of an entangled state.

10. The process of claim 1, wherein the photonic state of the input mode is entangled with a second photonic state of a second input mode, and the process further comprises writing quantum information associated with the second photonic state to a system including a second matter system.

11. A system comprising:
- an input mode for a photonic state representing quantum information;
- a matter system having quantum states including a first basis state and a second basis state;
- an excitation system capable of exciting at least one of the first and second basis states to a corresponding excited state;
- an emission mode for photons emitted from the matter system when the matter system transitions from the excited state; and
- a first measurement system capable of measuring a combined state of the input mode and the emission mode, wherein the measuring of the combined state is such that states of the emission mode and the matter system become disentangled and the resulting state of the matter system depends on the quantum information.

12. The system of claim 11, wherein the first measurement system comprises a Bell state analyzer.

13. The system of claim 11, wherein the first measurement system comprises:
- a non-absorbing parity detector; and
- a detector of photons corresponding to a diagonal basis of one of the input mode and the emission mode.

14. The system of claim 11, wherein the first measurement system comprises:
- a CNOT gate; and
- a detector of photons corresponding to a diagonal basis of one of the input mode and the emission mode.

15. The system of claim 11, wherein the measurement system comprises:
- a beam splitter;
- a parity detector;
- an optical switch that operates under control of a measurement result from the parity detector;
- a first measurement system in one output path of the optical switch; and
- a second measurement system in an alternative output path of the optical switch.

16. The system of claim 11, comprising:
- a second measurement system configured to measure the matter system;
- a state correction system; and
- an optical switch operable to direct emission mode into the first measurement system for an operation that writes the quantum information to the matter system and operable to direct the emission mode the state correction system for an operation selected according to a result from the second measurement system.

17. The system of claim 16, further comprising a source coupled to produce a known photon state of an auxiliary mode that passes through the state correction system.

18. The system of claim 11, further comprising a cavity containing the matter system, wherein parameters of the cavity cause preferential emission of photons from the matter system to the emission mode.

* * * * *

UNITED STATES PATENT AND TRADEMARK OFFICE
CERTIFICATE OF CORRECTION

| | | |
|---|---|---|
| PATENT NO. | : 8,023,828 B2 | Page 1 of 1 |
| APPLICATION NO. | : 11/252964 | |
| DATED | : September 20, 2011 | |
| INVENTOR(S) | : Raymond G. Beausoleil et al. | |

It is certified that error appears in the above-identified patent and that said Letters Patent is hereby corrected as shown below:

In column 18, line 18, in Claim 16, delete "mode the" and insert -- mode of the --, therefor.

Signed and Sealed this
Nineteenth Day of June, 2012

David J. Kappos
*Director of the United States Patent and Trademark Office*